United States

Laikin

[11] 3,799,655
[45] Mar. 26, 1974

[54] HIGH RESOLUTION REVERSE TELEPHOTO LENS

[75] Inventor: Milton Laikin, Los Angeles, Calif.

[73] Assignee: Photo-Sonics, Inc., Burbank, Calif.

[22] Filed: Sept. 15, 1972

[21] Appl. No.: 289,214

[52] U.S. Cl. ............................................. 350/220
[51] Int. Cl. ........................................... G02b 9/34
[58] Field of Search..................... 350/220, 215, 216

[56] References Cited
UNITED STATES PATENTS
2,548,569 4/1951 Tolle.............................. 350/220 X
3,689,132 9/1972 Baker............................. 350/220 X

*Primary Examiner*—John K. Corbin
*Attorney, Agent, or Firm*—Robert R. Thornton

[57] ABSTRACT

A high resolution reverse telephoto lens having a front biconcave element, a meniscus element, a biconvex element, and a rear cemented doublet element consisting of a front concave planar element and a rear biconvex element, in which the meniscus element controls spherical aberration by being positioned approximately concentric about the aperture stop and the lens has a long back focal length of 1.8 times the effective focal length with short overall dimensions by reason of the interrelationship between element radii, thicknesses, and spacing.

5 Claims, 1 Drawing Figure

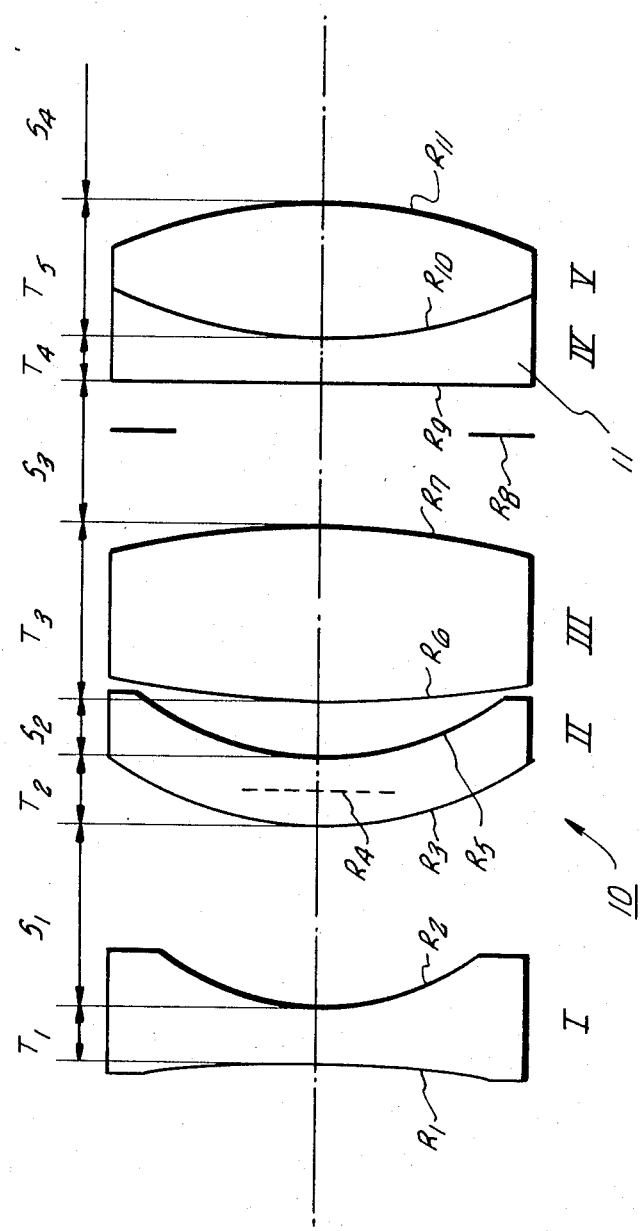

HIGH RESOLUTION REVERSE TELEPHOTO LENS

BACKGROUND OF THE INVENTION

1. Field of the Invention

This invention relates to an improved reverse or inverted telephoto lens and more particularly to a lens which has a relatively compact physical size with a controlled low spherical aberration and a long back focal length of approximately 1.8 times the effective focal length of the lens.

2. Description of the Prior Art

In photographic cameras, the advantages of long back focal length are well known and are particularly desirable when a fold is required between the lens and the image surface. Prior art lens systems with long back focal lengths have been characterized by an undesirably long physical dimension. For example, a typical prior art reverse telephoto lens obtained a back focal length of 1.66 times the effective focal length of the lens system by utilizing lens element spacing resulting in an overall length of 6.5 times the effective focal length of the lens system.

In such prior art reverse telephoto lenses, difficulty has been experienced in controlling spherical aberration. While the use of meniscus lens elements in other types of lenses is known in the prior art, it has not heretofore been recognized that a meniscus lens element may be utilized in reverse telephoto lenses of long back focal length to control spherical aberration.

SUMMARY OF THE INVENTION

According to the present invention, a reverse telephoto lens having a front biconcave element, a biconvex element, and a rear cemented doublet element consisting of a front concave planar element and a rear biconvex element is corrected for spherical aberration by the interposition between the front biconcave element and the biconvex element of a frontward meniscus element. In such a lens, a long back focal length of approximately 1.8 times the effective focal length of the lens system is achieved by the interrelationship of the dimensional characteristics of the lens system in accordance wtih the limits set out in the table contained herein, in which the front biconcave element has a refraction index no greater than 1.55 and a dispersion index no less than 62, the meniscus element has a refraction no less than 1.64 and a dispersion index no greater than 35, the biconvex element has a refraction index of from 1.52 to 1.61 and a dispersion index of from 39 to 50, the front concave planar element of the rear cemented doublet has a refraction index no less than 1.64 and a dispersion index no greater than 35, and the rear biconvex element of the cemented doublet has a refraction index no less than 1.60 and a dispersion index greater than 50, the indices of refraction being measured at 0.5461 microns and the index of dispersion being equal to $$\frac{N_e - 1}{N_{f'} - N_{c'}}$$

where $N_e$ is 0.5461 microns, $N_{f'}$ is 0.4799 microns and $N_{c'}$ is 0.6438 microns.

BRIEF DESCRIPTION OF THE DRAWING

The invention may be more readily understood by reference to the accompanying drawing, which is a schematic representation of a high resolution reverse telephoto lens according to the present invention. In the drawing, various parts are designated by reference characters according to those used in the data table which follows, the drawing particularly illustrating the lens element disposition, spacing, and other parameters in conjunction with the data tables.

DESCRIPTION OF THE PREFERRED EMBODIMENT

A preferred form of the high resolution reverse telephoto lens according to the present invention is illustrated in the accompanying drawing generally by the numeral 10. The telephoto lens 10 is composed of four successively and mutually spaced lens elements, a front lens nearest to entrant light being designated as I, a second element being designated by II, a third element being designated by III, and a rear cemented element 11 being designated by its component front concave planar element IV and rear biconvex element V. Element I is a biconcave lens, element II is a meniscus lens, and element III is a biconvex lens. The front element I is spaced from the frontwardly disposed meniscus element II by an axial distance $S_1$. Spaced rearwardly from the meniscus element II by a distance $S_2$ is the biconvex element III. Spaced rearwardly from the biconvex lens III by a distance $S_3$ is the cemented doublet 11.

The meniscus element II is preferably made of dense flint glass, with a refraction index no less than 1.64 and a dispersion index less than 35. The biconcave element I has refraction index of no greater than 1.55 and a dispersion index no less than 62, and is made from low dispersion crown glass. The lens element III has a refraction index selected to be any value from 1.52 to 1.61 and a dispersion index of any value from 39 through 50. The lens element IV has a refraction index no less than 1.64 and a dispersion index no greater than 35, while the lens element V has a refraction index no less than 1.6 and a dispersion index greater than 50.

For properly attaining a spherical aberration correction and long back focal length with the comparatively short effective focal length of the present invention, the constructional data for the reverse telephoto lens 10 should be specified according to the values stated in the table of mathematical statements following, where $R_1$ through $R_{11}$ designate the radii of the lens surfaces of successive lens members I through V, with $R_4$ representing the entrance pupil located approximately midway between surfaces $R_3$ and $R_5$, and $R_8$ representing an iris or aperture stop located between surfaces $R_7$ and $R_9$. The minus sign (−) is used as a sign for those surfaces having their centers of curvature located on the entrant sides of their vertices. The axial thicknesses of the successive lens elements are represented by $T_1$ to $T_5$, as shown in the drawing. The effective focal length of the reverse telephoto lens 10, according to the present invention, in the following table is designated as EFL.

$$1.5 \leq -R_1 \leq 2.3 \text{ EFL}$$
$$0.31 \leq R_2 \leq 0.47 \text{ EFL}$$
$$0.38 \leq R_3 \leq 0.57 \text{ EFL}$$
$$R_4 = \infty$$
$$0.36 \leq R_5 \leq 0.55 \text{ EFL}$$
$$1.3 \leq R_6 \leq 2.0 \text{ EFL}$$

$0.8 \leq -R_7 \leq 1.3$ EFL $R_8 = \infty$ $R_9 \geq 10.0$ EFL $0.46 \leq R_{10} \leq 0.7$ EFL $0.63 \leq -R_{11} \leq 0.95$ EFL $0.065 \leq T_1 \leq 0.10$ EFL $0.08 \leq T_2 \leq 0.12$ EFL $0.19 \leq T_3 \leq 0.29$ EFL $0.048 \leq T_4 \leq 0.072$ EFL $0.14 \leq T_5 \leq 0.22$ EFL $0.20 \leq S_1 \leq 0.31$ EFL $0.056 \leq S_2 \leq 0.084$ EFL $0.16 \leq S_3 \leq 0.24$ EFL By way of specific example of the preferred embodiment, parameters for a reverse telephoto lens system which will provide an effective focal length of 30 millimeters, or 1.181 inches, and a F number of 3.5, with a back focal length of 1.8 times the effective focal length, are as follows:

EFL = 30 mm (1.181 in.)   BLF = 1.8 EFL

| Lens element | Refraction index | Dispersion index | Thickness (in.) | Radius (in.) | Material |
|---|---|---|---|---|---|
| I | 1.52232 | 69.50 | $T_1 = 0.096$ | $R_1 = -2.2313$<br>$R_2 = 0.4653$ | PK-50. |
| | | | $S_1 = 0.309$ | | |
| II | 1.72311 | 29.29 | $T_2 = 0.118$ | $R_3 = 0.5624$<br>$R_4 = \infty$ (Entrance pupil).<br>$R_5 = 0.5392$ | SF-1. |
| | | | $S_2 = 0.084$ | | |
| III | 1.58175 | 41.31 | $T_3 = 0.287$ | $R_6 = 1.9427$<br>$R_7 = -1.2898$ | LF-4. |
| | | | $S_3 = 0.237$ | $R_8 = \infty$ | |
| IV | 1.72311 | 29.29 | $T_4 = 0.071$ | $R_9 = \infty$ | SF-1. |
| V | 1.64304 | 59.85 | $T_5 = 0.214$ | $R_{10} = 0.6841$<br>$R_{11} = -0.9352$ | LAK-21. |

Distance from $R_1$ to $R_4$ = 0.469 inches;

Distance from $R_{11}$ to objective image = 2.1226 inches;

Aperture stop $R_8$ is located approximately 0.154 inches behind surface $R_7$.

While the foregoing specific dimensional example of the preferred embodiment of the invention is given, it is to be understood that the invention, as will be apparent to those skilled in the art, comprehends any reverse telephoto lens utilizing the interrelationships set forth as above, rather than being limited to the specific values given in the example.

In order to control spherical aberration, the meniscus element II is utilized. The meniscus element II is interposed between the front biconcave element and the biconvex element in a frontward disposition. The meniscus element II is interposed so as to be approximately concentric about the aperture stop $R_8$, or an iris corresponding thereto, in order to provide for the control of spherical aberration. In accordance with the foregoing, at a distance of 2.1226 inches behind surface $R_{11}$, a 0.6 inch diagonal image is obtained in the specific embodiment set out above. Furthermore, the total physical length of the lens system is less than three times the effective focal length of the lens system, and the back focal length is 1.8 times the effective focal length of the lens system.

The invention claimed is:

1. In combination with a reverse telephoto lens having a front biconcave element, a biconvex element, a rear cemented doublet element consisting of a front concave planar element and a rear biconvex element, and an aperture stop or iris disposed between the biconvex element and the doublet,
   means for controlling spherical aberration comprising a forward meniscus element, said meniscus element having an index of refraction no less than 1.64 and a dispersion index no greater than 35, the index of refraction, $N_{e'}$ being measured at 0.5461 microns and the dispersion index being equal to $N_e - 1/N_{f'} - N_{c'}$ when $N_{f'}$ is measured at 0.4799 microns and $N_{c'}$ is measured at 0.6438 microns, and
   means for interposing said meniscus element between the biconcave element and the biconvex element so as to be approximately concentric about the aperture or iris stop.

2. A reverse telephoto lens comprising
   a front biconcave element havin a refraction index no greater than 1.55 and a dispersion index no less than 62;
   a biconvex element, air spaced from said front biconcave element, and having a refraction index of a preselected value of from 1.52 to 1.61 and a dispersion index of a preselected value of from 39 to 50; and
   a rear cemented doublet element spaced from said biconvex element and consisting of
      a front concave planar element having a refraction index no less than 1.64 and a dispersion index less than 35, and
      a rear biconvex element having a refraction index no less than 1.6 and a dispersion index greater than 50,
   the index of refraction, $N_{e'}$ being measured at 0.5461 microns and the dispersion index being equal to $N_e - 1/N_{f'} - N_{c'}$ when $N_{f'}$ is measured at 0.4799 microns and $N_{c'}$ is measured at 0.6438 microns.

3. The combination of claim 2 and including
   an aperture stop disposed between the biconvex element and the cemented doublet element;
   means for controlling spherical aberration comprising a forward meniscus element, said meniscus element having an index of refraction no less than 1.64 and a dispersion index no greater than 35; and
   means for interposing said meniscus element between the biconcave element and the biconvex element so as to be approximately concentric about the iris or aperture stop.

4. The combination of claim 3 and in which the specific optical data for constructing said reverse telephoto lens is given in the table of mathematical expressions following wherein $R_1$ to $R_{11}$ designate the radii of the lens surfaces of the successive lens elements from front to rear and the minus sign is assigned to those surfaces having their centers of curvature located on the entrant sides of their vertices, and the axial thicknesses of said successive lens elements are represented by $T_1$ to $T_5$ $1.5 \leq -R_1 \leq 2.3$ EFL
$0.31 \leq R_2 \leq 0.47$ EFL
$0.38 \leq R_3 \leq 0.57$ Efl
$R_4 = \infty$, represents the entrance pupil located approximately midway between surfaces $R_3$ and $R_5$
$0.36 \leq R_5 \leq 0.55$ EFL
$1.3 \leq R_6 \leq 2.0$ EFL
$0.8 \leq -R_7 \leq 1.3$ EFL
$R_8 = \infty$, represents the iris or aperture stop located between surfaces $R_7$ and $R_9$
$R_9 \geq 10.0$ EFL
$0.46 \leq R_{10} \leq 0.7$ EFL
$0.63 \leq -R_{11} \leq 0.95$ EFL
$0.065 \leq T_1 \leq 0.10$ EFL
$0.08 \leq T_2 \leq 0.12$ EFL
$0.19 \leq T_3 \leq 0.29$ EFL
$0.048 \leq T_4 \leq 0.072$ EFL
$0.14 \leq T_5 \leq 0.22$ EFL 5. The combination of claim 4 and in which the axial spacings between the specific elements are designated successively as $S_1$ to $S_3$ and are set forth in the following table of mathematical expressions $0.20 \leq S_1 \leq 0.31$ EFL
$0.056 \leq S_2 \leq 0.084$ EFL
$0.16 \leq S_3 \leq 0.24$ EFL

* * * * *